(12) United States Patent
Ichikawa et al.

(10) Patent No.: US 11,279,418 B2
(45) Date of Patent: Mar. 22, 2022

(54) VEHICLE-USE RESIN MODULE AND METHOD OF MANUFACTURING VEHICLE-USE RESIN MODULE

(71) Applicant: SUMITOMO RIKO COMPANY LIMITED, Komaki (JP)

(72) Inventors: Hiroyuki Ichikawa, Komaki (JP); Takashi Kume, Komaki (JP); Munehiro Wada, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 16/909,162

(22) Filed: Jun. 23, 2020

(65) Prior Publication Data
US 2021/0094628 A1      Apr. 1, 2021

(30) Foreign Application Priority Data

Sep. 26, 2019 (JP) .............................. JP2019-175063

(51) Int. Cl.
| | |
|---|---|
| *B32B 3/24* | (2006.01) |
| *B62D 29/00* | (2006.01) |
| *B62D 29/04* | (2006.01) |
| *B29C 45/14* | (2006.01) |
| *B60G 7/00* | (2006.01) |
| *B29L 31/30* | (2006.01) |
| *B32B 3/26* | (2006.01) |

(52) U.S. Cl.
CPC ...... *B62D 29/005* (2013.01); *B29C 45/14467* (2013.01); *B62D 29/041* (2013.01); *B29L 2031/30* (2013.01); *B32B 3/266* (2013.01); *B60G 7/001* (2013.01); *B60G 2206/122* (2013.01); *B60G 2206/71* (2013.01); *B60G 2206/8101* (2013.01); *B60G 2206/821* (2013.01); *Y10T 428/24273* (2015.01)

(58) Field of Classification Search
CPC ..................................................... B32B 3/266
See application file for complete search history.

(56) References Cited

U.S. PATENT DOCUMENTS

2011/0097025 A1* 4/2011 Satoji .................. F16C 32/0633
384/100

FOREIGN PATENT DOCUMENTS

JP          2019-64511 A       4/2019

\* cited by examiner

*Primary Examiner* — William P Watkins, III
(74) *Attorney, Agent, or Firm* — Oliff PLC

(57) ABSTRACT

A vehicle-use resin module including a strength member made of synthetic resin and including a mounting hole, and an attachment member attached to the mounting hole and configured to be subjected to an external force. The attachment member includes an outer fitting having a tubular part arranged in the mounting hole in an inserted state. The outer fitting includes an outer circumferential projection projecting to a radially outer side of the tubular part. The strength member is an insertion-molded component having a structure in which the outer circumferential projection of the outer fitting is embedded so as to be inserted inside a circumferential wall of the mounting hole. A surface of the tubular part of the outer fitting and a surface of the outer circumferential projection are each directly fixed to the strength member with an adhesive.

11 Claims, 5 Drawing Sheets

VEHICLE-USE RESIN MODULE AND METHOD OF MANUFACTURING VEHICLE-USE RESIN MODULE

INCORPORATED BY REFERENCE

The disclosure of Japanese Patent Application No. 2019-175063 filed on Sep. 26, 2019 including the specification, drawings and abstract is incorporated herein by reference in its entirety.

BACKGROUND OF THE INVENTION

1. Field of the Invention

The present invention relates to a resin module in which an attachment member is attached to a strength member made of synthetic resin, and more particularly to a vehicle-use resin module applied to a vehicle and a method of manufacturing the vehicle-use resin module.

2. Description of the Related Art

Conventionally, metals such as iron and alloys have been generally adopted as strength members for vehicles. For example, in addition to structural members such as suspension components and subframes, there are various brackets and reinforcers, and these strength members are required to have strength to maintain their shape against the force exerted from the outside.

On the other hand, in recent years, from the viewpoint of weight reduction and cost reduction, adoption of a strength member made of synthetic resin has been discussed, and it has been proposed, for example, in Japanese Unexamined Patent Publication No. JP-A-2019-64511.

SUMMARY OF THE INVENTION

However, the synthetic resin and the metal have different basic physical properties. Thus, for example, when the attachment member such as a joint to be attached to another member is assembled to the strength member to form a vehicle-use resin module, in some cases, it was difficult to obtain a sufficient fixing strength of the attachment member to the strength member for a long period of time.

For example, when a mounting hole is provided in the strength member and the outer fitting of the attachment member is secured and attached to the mounting hole by press-fitting or the like, due to the creep characteristics, heat sinkage of the circumferential wall portion of the mounting hole made of synthetic resin or the like, there is also a risk that the fixing strength of the outer fitting of the attachment member may be reduced. In order to deal with such a problem, it is conceivable to increase the component thickness of the circumferential wall of the mounting hole or to change the resin material only in the circumferential wall portion of the mounting hole. However, it is difficult to avoid new problems such as increase in size of the strength member and complication in manufacture.

It is therefore one object of this invention to provide a vehicle-use resin module of novel structure which is able to stably obtain a sufficient fixing strength of the attachment member attached to the mounting hole of the strength member made of synthetic resin for a long period of time, and to provide a method of manufacturing the vehicle-use resin module.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a vehicle-use resin module comprising: a strength member made of synthetic resin and including a mounting hole; and an attachment member attached to the mounting hole and configured to be subjected to an external force, the attachment member including an outer fitting having a tubular part arranged in the mounting hole in an inserted state, the outer fitting including an outer circumferential projection projecting to a radially outer side of the tubular part, wherein the strength member comprises an insertion-molded component having a structure in which the outer circumferential projection of the outer fitting is embedded inside a circumferential wall of the mounting hole such that the outer circumferential projection is inserted inside the circumferential wall, and a surface of the tubular part of the outer fitting and a surface of the outer circumferential projection are each directly fixed to the strength member with an adhesive.

According to the vehicle-use resin module of the present preferred embodiment, the outer fitting is mechanically secured to the strength member by the outer circumferential projection of the outer fitting being embedded inside the circumferential wall of the mounting hole. In addition, outer circumferential projection of the outer fitting and the outer circumferential surface of the tubular portion are directly fixed to the strength member with an adhesive. This makes it possible to prevent a gap at the interface between the metal and the synthetic resin in the resin module comprising the insertion-molded component, thereby improving the force for retaining the outer fitting in the strength member. These prevent quality variation or the like due to the occurrence of a gap between the outer fitting and the strength member due to thermal shrinkage or the like during molding of the insertion-molded component, as well as obtain sufficient fixing strength and durability at the attached site of the outer fitting to the strength member. Accordingly, excellent fixing strength can be exerted for a long period of time and with high reliability not only in the axial direction and the axis-perpendicular direction but also in each direction such as the prizing direction and the torsional direction.

A second preferred embodiment provides the vehicle-use resin module according to the first preferred embodiment, wherein a reinforcer made of metal is fixed to the strength member, and the outer circumferential projection of the outer fitting is overlapped with the reinforcer in a center axis direction of the mounting hole.

According to the vehicle-use resin module of the present preferred embodiment, the reinforcer and the outer circumferential projection of the outer fitting, which are overlapped with each other in the direction of dislodgment of the attachment member from the mounting hole (the center axis direction of the mounting hole), are both made of metal. Thus, for example, even when an external force is applied to the attachment member in the direction of dislodgment from the mounting hole, a high resistance to dislodgement can be obtained, thereby improving the fixing strength of the attachment member to the strength member.

A third preferred embodiment provides the vehicle-use resin module according to the second preferred embodiment, wherein the reinforcer integrally includes a circumferential-wall reinforcer positioned in the circumferential wall of the mounting hole and a plate-shaped reinforcer extending from the circumferential wall of the mounting hole to the radially outer side.

According to the vehicle-use resin module of the present preferred embodiment, with respect to the circumferential-wall reinforcer positioned in opposition to the outer circumferential projection of the outer fitting in the axial direction, it is possible to have the plate-shaped reinforcer bear and improve the fixing strength to the strength member and the retaining force by the strength member over a wide area, thereby enhancing load strength, durability, and the like by the reinforcer.

A fourth preferred embodiment provides the vehicle-use resin module according to the second or third preferred embodiment, wherein the reinforcer is spaced apart from an inner circumferential surface of the mounting hole to the radially outer side, and an axis-perpendicular intermediate resin layer comprising the synthetic resin that constitutes the strength member is interposed between the reinforcer and the tubular part of the outer fitting.

According to the vehicle-use resin module of the present preferred embodiment, the reinforcer improves the resistance to dislodgement of the attachment member from the mounting hole, and in addition, the axis-perpendicular intermediate resin layer can enhance the bonding area of the attachment member (outer fitting) and the strength member. Besides, the synthetic resin layer interposed between the reinforcer and the outer fitting can moderate the dimensional accuracy required for the attachment surface of the reinforcer and the outer fitting.

A fifth preferred embodiment provides the vehicle-use resin module according to the second or third preferred embodiment, wherein the reinforcer is exposed on an inner circumferential surface of the mounting hole, and the reinforcer and the tubular part of the outer fitting are in contact with each other.

According to the vehicle-use resin module of the present preferred embodiment, the reinforcer improves the resistance to dislodgement of the attachment member from the mounting hole. In addition, in comparison with the case where the entire contact surface of the outer fitting in the strength member comprises the synthetic resin, it is possible to, for example, improve strength-resistant characteristics by the outer fitting being attached to the reinforcer of metal in a state of contact between the metals.

A sixth preferred embodiment provides the vehicle-use resin module according to any one of the second through fifth preferred embodiments, wherein the reinforcer and the outer circumferential projection are spaced apart from each other in the center axis direction of the mounting hole, and an axial intermediate resin layer comprising the synthetic resin that constitutes the strength member is interposed between the reinforcer and the outer circumferential projection.

According to the vehicle-use resin module of the present preferred embodiment, the resin is interposed axially between the reinforcer and the outer circumferential projection of the outer fitting. Thus, the dimensional accuracy required for both components can be moderated, and it is also possible to obtain sufficient load bearing capability by suppressing occurrence of shear stress in the intermediate resin layer due to an external input.

A seventh preferred embodiment provides the vehicle-use resin module according to any one of the second through sixth preferred embodiments, wherein at least one of the outer circumferential projection of the outer fitting and the reinforcer is provided continuously about an entire circumference of the mounting hole in a circumferential direction.

According to the vehicle-use resin module of the present preferred embodiment, it is possible to stably obtain a sufficient facing area in the axial direction between the outer circumferential projection and the reinforcer regardless of the relative positions of the outer fitting and the reinforcer in the circumferential direction, thereby stably exhibiting the effect of improving the resistance to dislodgement in the axial direction by the reinforcer.

An eighth preferred embodiment provides a method of manufacturing a vehicle-use resin module comprising a strength member made of synthetic resin and including a mounting hole, and an attachment member attached to the mounting hole and configured to be subjected to an external force, the method comprising: adopting an outer fitting in the attachment member, the outer fitting including a tubular part configured to be arranged in the mounting hole in an inserted state and an outer circumferential projection projecting to a radially outer side of the tubular part; inserting the outer fitting into a forming cavity of a mold of the strength member; and performing insert molding by filling the forming cavity with resin material with an adhesive attached to the tubular part and the outer circumferential projection of the outer fitting such that, at the same time of molding of the strength member, the tubular part of the outer fitting is adhered to the mounting hole of the strength member while the outer circumferential projection of the outer fitting is embedded and adhered inside a circumferential wall of the mounting hole such that the outer circumferential projection is inserted inside the circumferential wall.

According to the method of manufacturing a vehicle-use resin module of the present preferred embodiment, by performing the insert molding with the adhesive attached to the surface of the outer fitting, the outer fitting and the strength member can be adhered to each other at the same time of molding of the strength member. This prevents the occurrence of a gap between the strength member and the outer fitting due to thermal shrinkage or the like during molding of the strength member, thereby suppressing variation in fixing strength of the attachment member by the strength member and hence in load bearing capability and durability.

A ninth preferred embodiment provides the method of manufacturing a vehicle-use resin module according to the eighth preferred embodiment, wherein a reinforcer configured to be embedded inside the strength member is set within the forming cavity of the strength member together with the outer fitting with an adhesive attached to an outer circumferential surface of the reinforcer such that the reinforcer is adhered to the strength member at the same time of molding of the strength member.

According to the method of manufacturing a vehicle-use resin module of the present preferred embodiment, it is possible to reliably and stably provide the adhesive layer to the interface between the strength member and the reinforcer, so as to adhere both members to each other.

With the vehicle-use resin module according to the present invention and the method of the present invention, the fixing strength between the strength member and the attachment member can be stably obtained.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Hereinafter, in order to more specifically clarify the present invention, practical embodiments of the present invention will be described in detail with reference to the drawings.

Figure 1:
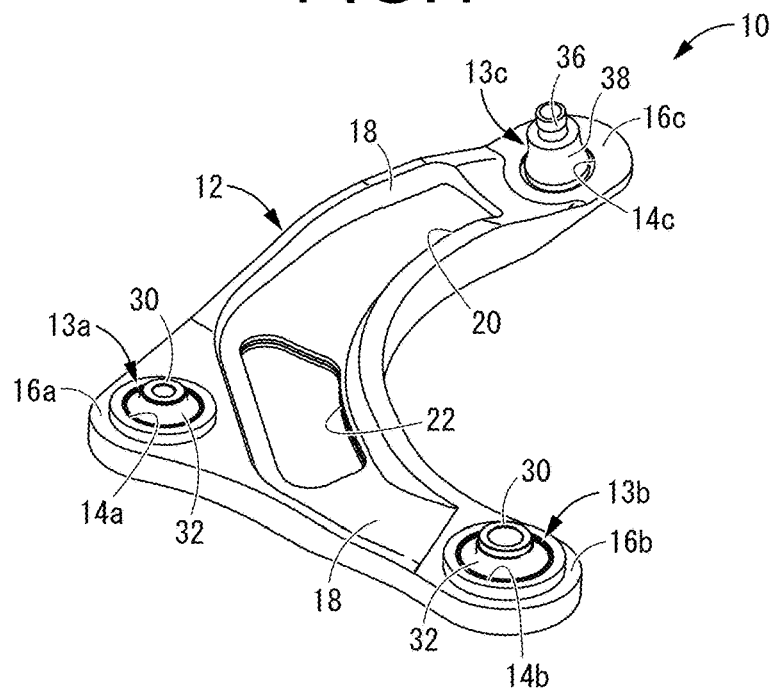
FIG. 1 is a perspective view showing a vehicle-use resin module according to a first practical embodiment of the present invention.
Figure 2:
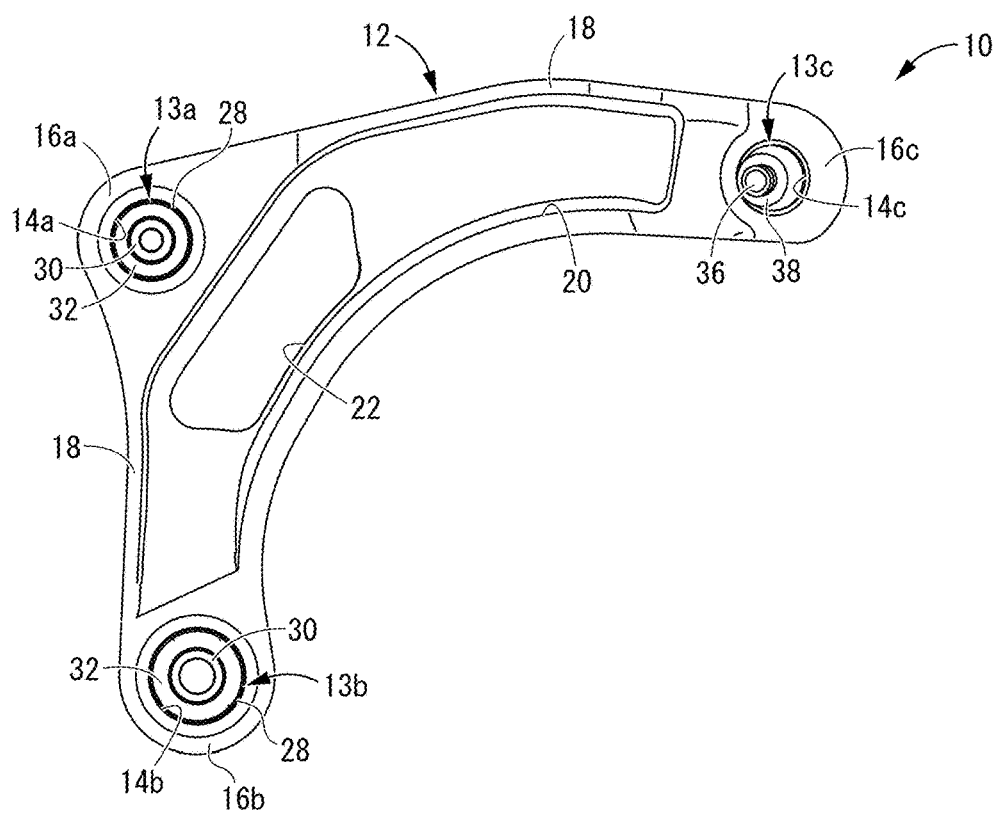
FIG. 2 is a top plan view of the vehicle-use resin module shown in FIG. 1.

First, FIGS. 1 and 2 depict a vehicle-use resin module 10 according to a first practical embodiment of the present invention. The vehicle-use resin module 10 of the present practical embodiment includes a suspension arm 12 serving as a strength member and attachment members 13a, 13b, 13c attached to the suspension arm 12 and configured to be subjected to an external force. In the following description, the vertical direction refers to the direction perpendicular to the plane of the page of FIG. 2, but does not necessarily coincide with the orientation of the vehicle-use resin module 10 (suspension arm 12) when mounted on the vehicle.

Described more specifically, the suspension arm 12 is a member used for an automotive suspension mechanism, and is an arm member having a roughly L shape in plan view overall. As a material of the suspension arm 12, a rigid synthetic resin such as a conventionally known thermoplastic resin and thermosetting resin can be adopted. Here, in consideration of adhesiveness with a metal described later and the like in addition to durability and load bearing capability, a thermoplastic resin is preferable. Besides, the suspension arm 12 may be fiber-reinforced with short fibers, long fibers or the like of carbon fiber reinforced plastics (CFRP), glass fiber reinforced plastics (GFRP) or the like as needed. The suspension arm 12 of the present practical embodiment is formed as an insertion-molded component including the attachment members 13a, 13b, 13c and a reinforcer 42, as described later.

Furthermore, the suspension arm 12 includes mounting holes 14a, 14b, 14c penetrating the suspension arm 12 in the vertical direction. In the present practical embodiment, three mounting holes 14a, 14b, 14c (a first mounting hole 14a, a second mounting hole 14b, and a third mounting hole 14c) are provided.

That is, the suspension arm 12 of the present practical embodiment includes three circumferential walls 16a, 16b, 16c (a first circumferential wall 16a, a second circumferential wall 16b, and a third circumferential wall 16c) that respectively constitute the three mounting holes 14a, 14b, and 14c. The first circumferential wall 16a and the second circumferential wall 16b, and the first circumferential wall 16a and the third circumferential wall 16c are connected by respective connecting parts 18, 18. The inner circumferential surface of each of the circumferential walls 16a, 16b, 16c includes a fitting concave 19 that opens to the radial inside. In the present practical embodiment, each fitting concave 19 is provided continuously about the entire circumference in the circumferential direction. In the present practical embodiment in particular, each fitting concave 19 is provided on the inner circumferential surface of the upper end portion of the corresponding one of the circumferential walls 16a, 16b, 16c.

The suspension arm 12 may be provided with a recess 20 and a through hole 22 for lightening on the upper surface and/or the lower surface thereof.

The attachment members 13a, 13b, 13c configured to be subjected to an external force are attached to the respective mounting holes 14a, 14b, 14c of the suspension arm 12. In the present practical embodiment, three attachment members 13a, 13b, 13c (first and second vibration damping devices 13a, 13b, and ball joint 13c) are provided. The first and second vibration damping devices 13a, 13b are attached to the first and second mounting holes 14a, 14b respectively, while the ball joint 13c is attached to the third mounting hole 14c. Since the first vibration damping device 13a and the second vibration damping device 13b have roughly the same structure, the first vibration damping device 13a will be described below and the description of the second vibration damping device 13b is omitted.

Figure 3:
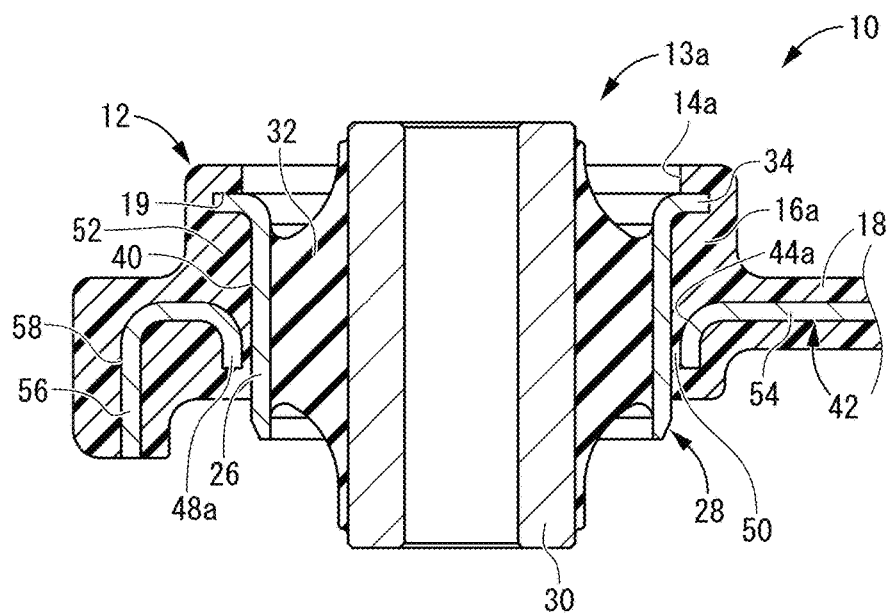
FIG. 3 is an enlarged vertical cross sectional view of a principal part of the vehicle-use resin module shown in FIG. 1.

Here, FIG. 3 shows a vertical cross sectional view of the mounted portion of the first vibration damping device 13a. As shown in FIG. 3, the first vibration damping device 13a includes a large-diameter outer fitting 28 having a tubular part 26, and an inner fitting 30 having a roughly tubular or rod shape, both extending in the vertical direction. The outer fitting 28 is externally disposed about the inner fitting 30 in a roughly coaxial manner, and the outer fitting 28 and the inner fitting 30 are remote from each other in the radial direction (direction perpendicular to the vertical direction). A roughly tubular rubber elastic body 32 is disposed radially between the outer fitting 28 and the inner fitting 30. The outer circumferential surface of the rubber elastic body 32 is bonded by vulcanization to the inner circumferential surface of the outer fitting 28, while the inner circumferential surface of the rubber elastic body 32 is bonded by vulcanization to the outer circumferential surface of the inner fitting 30. In the present practical embodiment, the rubber elastic body 32 takes the form of an integrally vulcanization molded component including the outer fitting 28 and the inner fitting 30.

The tubular part 26 of the outer fitting 28 includes an outer circumferential projection 34 projecting to the radially outer side, and in the present practical embodiment, the outer circumferential projection 34 is provided at the upper end of the tubular part 26 continuously about the entire circumference in the circumferential direction.

Besides, the ball joint 13c includes, for example, an outer fitting (not shown) having a roughly bottomed tubular shape, and a ball stud 36 inserted into the outer fitting. The upper end of the ball stud 36 is a screw part, and the lower end thereof is provided with a spherical body. By the spherical body being disposed in the outer fitting, the ball stud 36 can rotate or swing. The upper end of the outer fitting is closed off by a rubber cover 38, and the ball stud 36 penetrates the rubber cover 38 so as to project upward. Furthermore, an outer circumferential projection projecting to the radially outer side is provided on the tubular part of the outer fitting continuously about the entire circumference in the circumferential direction, similarly to the outer circumferential projection 34 of the first vibration damping device 13a, for example. If the third mounting hole 14c has a bottomed tubular shape with the lower opening closed off by a bottom wall, the outer fitting that constitutes the ball joint 13c may have a shape penetrated in the vertical direction, similarly to the outer fitting 28 of the first vibration damping device 13a, for example.

As a material of the outer fitting 28 constituting the attachment members 13a, 13b, 13c, a metal such as iron and aluminum alloy may be adopted, and in consideration of adhesiveness with the strength member (suspension arm 12) made of synthetic resin described later and the like, an aluminum alloy is preferable.

The first and second vibration damping devices 13a, 13b and the ball joint 13c are arranged in the first, second and third mounting holes 14a, 14b, 14c in an inserted state, and the outer circumferential projection 34 of each attachment member 13a/13b/13c is inserted in the corresponding fitting concave 19 of each mounting hole 14a/14b/14c. That is, the outer circumferential projection 34 that projects from the outer fitting 28 of the attachment member 13a/13b/13c to the radially outer side is embedded inside the corresponding circumferential wall 16a/16b/16c of the mounting hole 14a/14b/14c such that the outer circumferential projection 34 is inserted inside of the circumferential wall 16a/16b/16c.

Moreover, the outer circumferential surface (surface) of the tubular part 26 of the outer fitting 28 of each attachment member 13a/13b/13c and the inner circumferential surface of the corresponding circumferential wall 16a/16b/16c are in contact with each other and are directly fixed together. Meanwhile, the outer surface (surface) of the outer circumferential projection 34 of each attachment member 13a/13b/13c and the inner surface of the fitting concave 19 of the corresponding circumferential wall 16a/16b/16c are in contact with and directly fixed to each other. An adhesive layer made of an adhesive 40 is provided between these contact surfaces, and due to the adhesive 40, the outer fitting 28 of each attachment member 13a/13b/13c and the corresponding circumferential wall 16a/16b/16c are fixed to each other. Since the thickness dimension of the adhesive (adhesive layer) 40 is so small as to be substantially ignored, FIG. 3 depicts the adhesive (adhesive layer) 40 with its thickness dimension being approximately zero.

As the adhesive 40 for adhering the outer fitting 28 made of metal and each of the circumferential walls 16a, 16b, 16c made of synthetic resin, for example, "VESTAMELT (registered trademark) Hylink" manufactured by Daicel-Evonik Ltd. or the like may be adopted.

Figure 4:
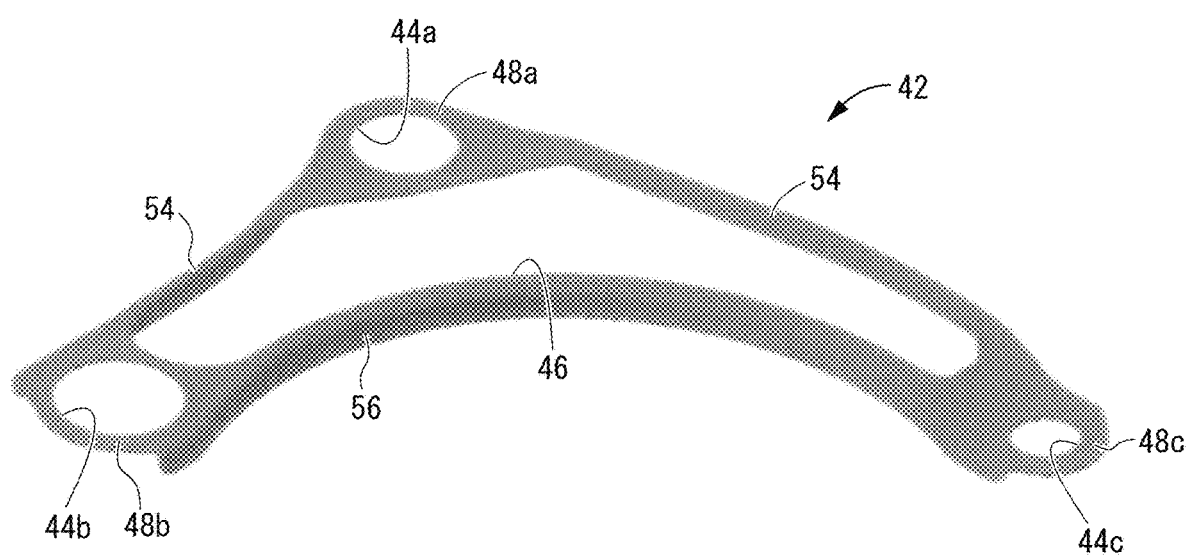
FIG. 4 is a perspective view showing a reinforcer that constitutes the vehicle-use resin module shown in FIG. 1.

In the present practical embodiment, the reinforcer 42 as shown in FIG. 4 is fixed to the suspension arm 12 in an embedded state. In particular, in the present practical embodiment, the reinforcer 42 is embedded over roughly the entire suspension arm 12, and has a roughly L shape similar to the suspension arm 12. The reinforcer 42 is penetrated in the vertical direction by a first insertion hole 44a, a second insertion hole 44b, and a third insertion hole 44c that are formed at positions respectively corresponding to the first, second, and third mounting holes 14a, 14b, 14c in the suspension arm 12. Then, the first vibration damping device 13a, the second vibration damping device 13b, and the ball joint 13c are respectively inserted into the first, second, and third insertion holes 44a, 44b, 44c, so as to be attached to the respective first, second, and third mounting holes 14a, 14b, 14c. In addition, the reinforcer 42 may be provided with a recess or a through hole 46 for lightening in a portion other than the positions where the first, second, and third insertion holes 44a, 44b, 44c are formed.

Furthermore, in the present practical embodiment, first, second, and third tubular reinforcers 48a, 48b, 48c, which project downward so as to have a shape processed by burring, are provided at the respective opening peripheral edges of the first, second, and third insertion holes 44a, 44b, 44c. These tubular reinforcers 48a, 48b, 48c are embedded respectively in the first, second, and third circumferential walls 16a, 16b, 16c constituting the first, second, and third mounting holes 14a, 14b, 14c. The tubular reinforcers 48a, 48b, 48c each define a circumferential-wall reinforcer that reinforces the circumferential wall of the corresponding one of the mounting holes 14a, 14b, 14c.

In the present practical embodiment, the reinforcer 42 is spaced apart from the inner circumferential surface of each of the mounting holes 14a, 14b, 14c to the radially outer side. That is, the inner circumferential surface of each tubular reinforcer 48a/48b/48c is located on the radially outer side of the inner circumferential surface of the corresponding circumferential wall 16a/16b/16c, namely, the outer circumferential surface of the corresponding tubular part 26 of the outer fitting 28. Accordingly, a gap is formed radially between each tubular reinforcer 48a/48b/48c and the corresponding tubular part 26 of the outer fitting 28. Besides, the synthetic resin constituting the circumferential walls 16a, 16b, 16c extends and is filled into the radial gap between each tubular reinforcer 48a/48b/48c and the corresponding tubular part 26. With this configuration, an axis-perpendicular intermediate resin layer 50 is interposed between the reinforcer 42 and the tubular part 26 of the outer fitting 28, and in the present practical embodiment, the axis-perpendicular intermediate resin layer 50 has a roughly annular shape.

Moreover, in the present practical embodiment, the outer circumferential projection 34 projecting from the outer fitting 28 to the radially outer side and the corresponding tubular reinforcer 48a/48b/48c located on the radially outer side of the tubular part 26 of the outer fitting 28 are opposed to and overlapped with each other with a gap in the vertical direction (the center axis direction of each mounting hole 14a/14b/14c). With this configuration, a part of the synthetic resin forming the circumferential walls 16a, 16b, 16c is located in the vertical gap between the outer circumferential projection 34 and the corresponding tubular reinforcer 48a/48b/48c. That is, an axial intermediate resin layer 52 is interposed between the reinforcer 42 and the outer circumferential projection 34 of the outer fitting 28, and in the present practical embodiment, the axial intermediate resin layer 52 has a roughly annular shape.

Then, the first tubular reinforcer 48a and the second tubular reinforcer 48b, and the first tubular reinforcer 48a and the third tubular reinforcer 48c are connected by respective plate-shaped reinforcers 54, 54 that extend in a roughly plate shape. Thus, the suspension arm 12 integrally includes the first, second, and third tubular reinforcers (circumferential-wall reinforcers) 48*a*, 48*b*, 48*c* and the plate-shaped reinforcers 54, 54. With this configuration, the connecting parts 18, 18 of the suspension arm 12 are reinforced by the plate-shaped reinforcers 54, 54. That is, the plate-shaped reinforcers 54, 54 of the reinforcer 42 extend from the tubular reinforcers 48*a*, 48*b*, 48*c* provided on the respective circumferential walls (circumferential walls 16*a*, 16*b*, 16*c*) of the mounting holes 14*a*, 14*b*, 14*c* to the radially outer side.

Note that the outer peripheral edge portion of the reinforcer 42 may be provided with a high-rigidity part 56 whose rigidity is improved by its vertical dimension being partially increased.

As a material of the reinforcer 42, a metal such as iron and an aluminum alloy may be adopted, and an aluminum alloy is preferable in consideration of adhesiveness with the strength member (suspension arm 12) described later and the like.

Besides, in the present practical embodiment, the surface of the reinforcer 42 is in contact with the suspension arm 12 over roughly its entirety, and an adhesive layer of an adhesive 58 is provided between these contact surfaces. Accordingly, the reinforcer 42 is adhered to the suspension arm 12 over roughly the entire surface. In FIG. 3, the adhesive (adhesive layer) 58 is illustrated with its thickness dimension being approximately zero. The material of the adhesive 58 may be the same as the material of the adhesive 40 provided between the suspension arm 12 and the outer fitting 28, but may be different therefrom.

Figure 5:
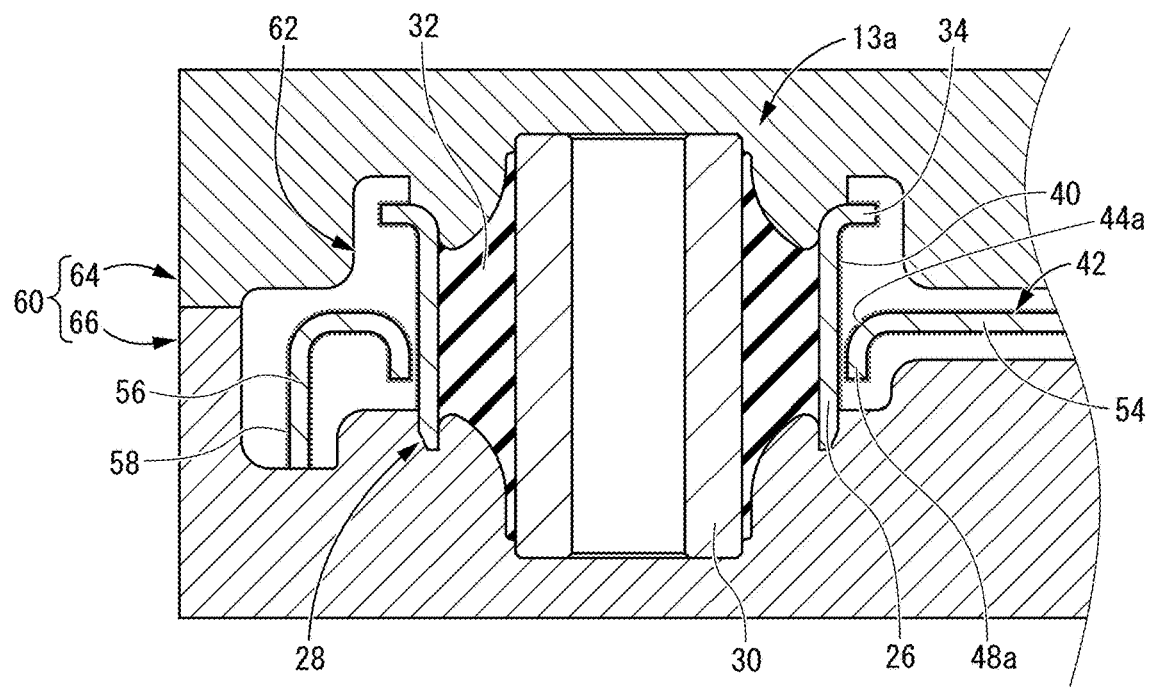
FIG. 5 is a view suitable for explaining a specific example of a method of manufacturing the vehicle-use resin module shown in FIG. 1.

Hereinafter, a specific example of the method of manufacturing the vehicle-use resin module 10 of the present practical embodiment will be described with reference to FIG. 5, but the method of manufacturing the vehicle-use resin module 10 is not limited. In FIG. 5, the mounted portion of the first vibration damping device 13*a* is shown and described, but the same applies to the second vibration damping device 13*b* and the ball joint 13*c*, so that description thereof will be omitted.

First, the rubber elastic body 32 including the outer fitting 28 and the inner fitting 30 (first vibration damping device 13*a*) is formed as an integrally vulcanization molded component. Besides, the reinforcer 42 having the shape shown in FIG. 4 is formed by, for example, a blank metal plate or the like being subjected to press working or the like. Next, the adhesive 40 is attached to the surface of the outer fitting 28 including the outer circumferential projection 34, and the adhesive 58 is attached to the surface of the reinforcer 42. In FIG. 5, the adhesives 40, 58 are shown in gray, and the thickness dimensions of the adhesives 40, 58 are exaggerated. Further, the means for attaching the adhesive is not limited, but conventionally known means such as sticking, applying, coating, covering, and filming can be adopted.

Then, the integrally vulcanization molded component of the rubber elastic body 32 to which the adhesive 40 is attached and the reinforcer 42 to which the adhesive 58 is attached are arranged (inserted) in a forming cavity 62 of a mold 60 of the suspension arm 12. That is, by placing the integrally vulcanization molded component of the rubber elastic body 32 and the reinforcer 42 on a lower mold 66 and overlapping an upper mold 64 on top of them, the forming cavity 62 is formed between the opposed upper and lower molds 64, 66, while the integrally vulcanization molded component of the rubber elastic body 32 and the reinforcer 42 are arranged in the forming cavity 62. Note that the adhesives 40, 58 may be attached to the outer fitting 28 and/or the reinforcer 42 after the integrally vulcanization molded component of the rubber elastic body 32 and/or the reinforcer 42 is secured to the lower mold 66. Moreover, in the present practical embodiment, the mold 60 comprises the upper mold 64 and the lower mold 66, but may comprise three or more molds.

Subsequently, the resin material of the suspension arm 12 is filled in the forming cavity 62 and molding (insert molding) is performed. By so doing, at the same time of molding of the suspension arm 12, the suspension arm 12 and the outer fitting 28, as well as the suspension arm 12 and the reinforcer 42 are directly adhered by the adhesives 40, 58. Specifically, at the same time of formation of the first circumferential wall 16*a* of the first mounting hole 14*a*, the inner circumferential surface of the first circumferential wall 16*a* is directly adhered to the outer circumferential surface (surface) of the tubular part 26 of the outer fitting 28, while the outer surface of the reinforcer 42 is directly adhered to the suspension arm 12 in an embedded state over roughly its entirety. As a result, the suspension arm 12 of the present practical embodiment comprises an insertion-molded component including the attachment members 13*a*, 13*b*, 13*c* and the reinforcer 42.

Further, in the present practical embodiment, the outer circumferential projection 34 of the outer fitting 28 is configured to project into the forming cavity 62, and the resin material of the suspension arm 12 is configured to extend above the outer circumferential projection 34. With this configuration, by the suspension arm 12 being molded, the fitting concave 19 is formed so as to cover the outer circumferential projection 34. In other words, the outer circumferential projection 34 of the outer fitting 28 is embedded inside the first circumferential wall 16*a* of the first mounting hole 14*a* such that the outer circumferential projection 34 is inserted inside the first circumferential wall 16*a*. Then, at the same time of molding of the suspension arm 12, the outer surface (surface) of the outer circumferential projection 34 and the inner surface of the fitting concave 19 are adhered to each other via an adhesive layer formed through curing, reaction and the like of the adhesive 40.

Then, the vehicle-use resin module 10 of the present practical embodiment can be manufactured by being released from the mold 60.

The vehicle-use resin module 10 is used as a lower arm, which is a suspension component of a vehicle, by a vehicle-body side member being secured to the inner fittings 30 of the first and second vibration damping devices 13*a*, 13*b*, and by the ball joint 13*c* being attached to a wheel via a carrier, for example.

With the vehicle-use resin module 10 of the present practical embodiment manufactured in this way, the suspension arm 12 is molded with the adhesive 40 attached to the surface of the outer fitting 28, so that the surface of the outer fitting 28 is adhered at the same time of formation of the suspension arm 12. By so doing, even if the suspension arm 12 contracts during formation, it is possible to prevent a gap from being generated between the suspension arm 12 and the outer fitting 28. As a result, the suspension arm 12 and the outer fitting 28 are more firmly adhered, and in combination with the mechanical engagement of the outer circumferential projection 34 with the fitting concave 19 (inside of the circumferential wall 16*a*/16*b*/16*c*), it is possible to effectively prevent the attachment member 13*a*/13*b*/13*c* from dislodging from the mounting hole 14*a*/14*b*/14*c*.

In this practical embodiment in particular, the reinforcer 42 is secured to the suspension arm 12 in an embedded state. By the suspension arm 12 being molded with the adhesive 58 attached to the surface of the reinforcer 42, the surface of the reinforcer 42 is adhered at the same time of formation of the suspension arm 12. This avoids generation of a gap between the suspension arm 12 and the reinforcer 42 during formation of the suspension arm 12, thereby effectively preventing the reinforcer 42 from dislodging from the suspension arm 12 or from rattling inside the suspension arm 12.

The outer circumferential projection 34 of the outer fitting 28 and the corresponding one of the first, second, and third tubular reinforcers 48a, 48b, 48c of the reinforcer 42 are opposed to each other in the vertical direction, so that the load in the direction of dislodgment of the attachment member 13a/13b/13c from the mounting hole 14a/14b/14c (namely, the vertical direction) can be received by one of the outer fitting 28 and the reinforcer 42, both of which are made of metal. This makes it possible to more effectively prevent dislodgment of the attachment member 13a/13b/13c from the mounting hole 14a/14b/14c.

In this practical embodiment in particular, the outer circumferential projection 34 and the first, second, and third tubular reinforcers 48a, 48b, 48c are all provided continuously about the entire circumference in the circumferential direction. Therefore, when the reinforcer 42 is arranged (inserted) in the forming cavity 62, operation for aligning the outer circumferential projection 34 and the first, second, and third tubular reinforcers 48a, 48b, 48c in the circumferential direction can be omitted.

Further, in the present practical embodiment, the axial intermediate resin layer 52 is provided vertically between the outer circumferential projection 34 of the outer fitting 28 and the corresponding one of the first, second, and third tubular reinforcers 48a, 48b, 48c of the reinforcer 42, and the axial intermediate resin layer 52 is adhered to the tubular part 26 of the outer fitting 28 with the adhesive 40. Thus, in comparison with the case where the outer circumferential projection 34 and the corresponding one of the first, second, and third tubular reinforcers 48a, 48b, 48c (or the plate-shaped reinforcer 54) are in direct contact with each other, it is also possible to obtain a larger bonding area of the circumferential wall 16a/16b/16c and the outer fitting 28.

Moreover, in the present practical embodiment, the axis-perpendicular intermediate resin layer 50 is provided radially between the first, second, and third tubular reinforcers 48a, 48b, 48c of the reinforcer 42 and the corresponding tubular part 26 of the outer fitting 28, and the axis-perpendicular intermediate resin layer 50 is adhered to the tubular part 26 of the outer fitting 28 via the adhesive 40. Thus, it is also possible to obtain an even larger bonding area of the circumferential wall 16a/16b/16c and the outer fitting 28.

Furthermore, in the present practical embodiment, the reinforcer 42 integrally includes the first, second, and third tubular reinforcers 48a, 48b, 48c and the plate-shaped reinforcers 54, 54. Thus, the number of parts can be reduced, and the reinforcer 42 can be easily arranged (inserted) in the forming cavity 62.

Figure 6:
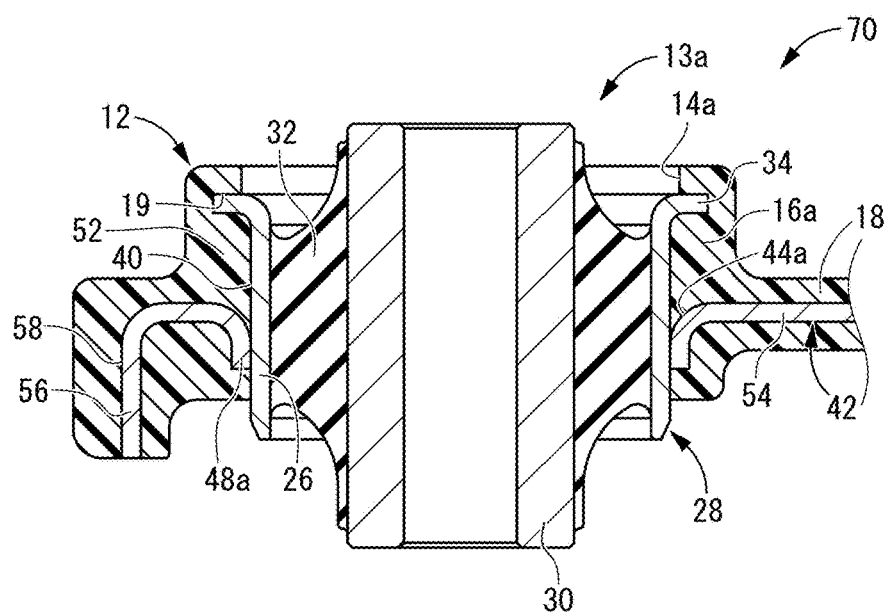
FIG. 6 is an enlarged vertical cross sectional view of a principal part of a vehicle-use resin module according to a second practical embodiment of the present invention, corresponding to FIG. 3.

Next, FIG. 6 depicts a vehicle-use resin module 70 according to a second practical embodiment of the present invention. Since the vehicle-use resin module 70 of the present practical embodiment has the structure similar to that of the vehicle-use resin module 10 of the first practical embodiment, only the differences therefrom will be described below. That is, in the first practical embodiment, the axis-perpendicular intermediate resin layer 50 is provided radially between the tubular part 26 of the outer fitting 28 and the first tubular reinforcer 48a of the reinforcer 42. However, in the present practical embodiment, the tubular part 26 and the first tubular reinforcer 48a are in contact with each other, and the axis-perpendicular intermediate resin layer (50) is not provided. In the following description, components and parts that are substantially identical with those in the preceding first practical embodiment will be assigned like symbols and not described in any detail. Further, in FIG. 6, the mounted portion of the first vibration damping device 13a is shown and described, but the same applies to the second vibration damping device 13b and the ball joint 13c, so that description thereof will be omitted.

Therefore, in the present practical embodiment, the inner circumferential surface of the first tubular reinforcer 48a of the reinforcer 42 is exposed on the inner circumferential surface of the first circumferential wall 16a of the first mounting hole 14a. Accordingly, the tubular part 26 of the outer fitting 28 and the first tubular reinforcer 48a are in contact with each other, so that the first vibration damping device 13a is also supported by the reinforcer 42. In the present practical embodiment in particular, the inside diameter dimension of the first tubular reinforcer 48a is roughly equal to or slightly smaller than the outside diameter dimension of the tubular part 26 of the outer fitting 28. When the integrally vulcanization molded component of the rubber elastic body 32 and the reinforcer 42 are arranged (inserted) in the forming cavity 62 of the mold 60, the outer fitting 28 is configured to be press-fitted into the first tubular reinforcer 48a.

With the vehicle-use resin module 70 of the present practical embodiment having the above-described structure as well, the same effect as that of the preceding practical embodiment can be exhibited. In the present practical embodiment in particular, the attachment member 13a/13b/13c is supported by the reinforcer 42 in addition to the engagement structure of the outer circumferential projection 34 with the fitting concave 19 and the adhesive effect of the adhesive 40. This makes it possible to more effectively prevent the attachment member 13a/13b/13c from dislodging from the mounting hole 14a/14b/14c.

Figure 7:
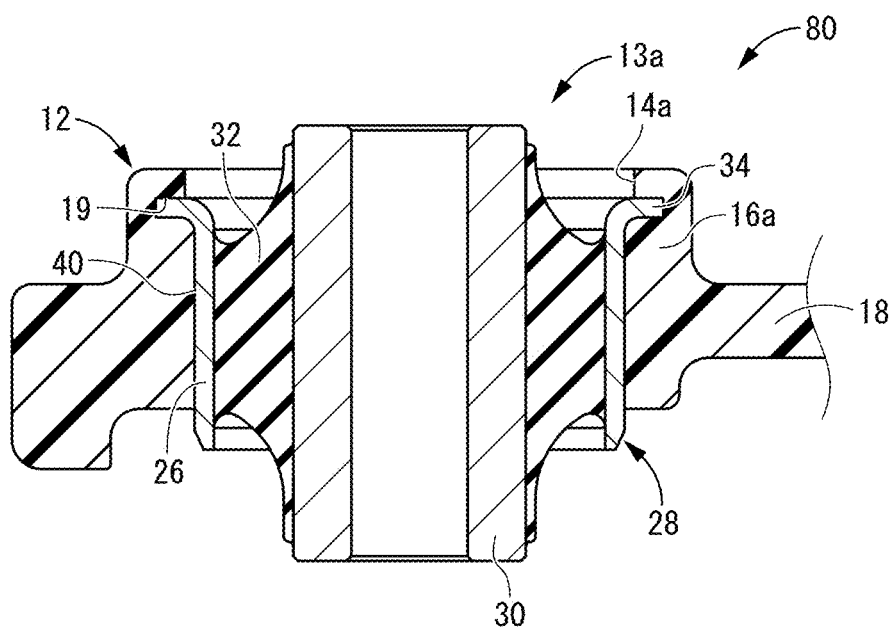
FIG. 7 is an enlarged vertical cross sectional view of a principal part of a vehicle-use resin module according to a third practical embodiment of the present invention, corresponding to FIG. 3.

Next, FIG. 7 depicts a vehicle-use resin module 80 according to a third practical embodiment of the present invention. Since the vehicle-use resin module 80 of the present practical embodiment also has the structure similar to that of the vehicle-use resin module 10 of the first practical embodiment, only the differences therefrom will be described below. Further, in FIG. 7, the mounted portion of the first vibration damping device 13a is shown and described, but the same applies to the second vibration damping device 13b and the ball joint 13c, so that description thereof will be omitted.

That is, in the present practical embodiment, compared to the first and second practical embodiments, the reinforcer (42) is not provided. In the vehicle-use resin module 80 of the present practical embodiment having such a structure as well, the outer circumferential projection 34 of the outer fitting 28 is inserted into the first circumferential wall 16a of the first mounting hole 14a, and the contact surfaces of the outer fitting 28 and the first circumferential wall 16a are directly adhered with the adhesive 40. This makes it possible to exhibit the same effects as those of the first and second practical embodiments.

Although the practical embodiments of the present invention have been described above, the present invention is not limitedly interpreted based on the specific description in the practical embodiments, but may be embodied with various changes, modifications and improvements which may occur to those skilled in the art.

Figure 8:
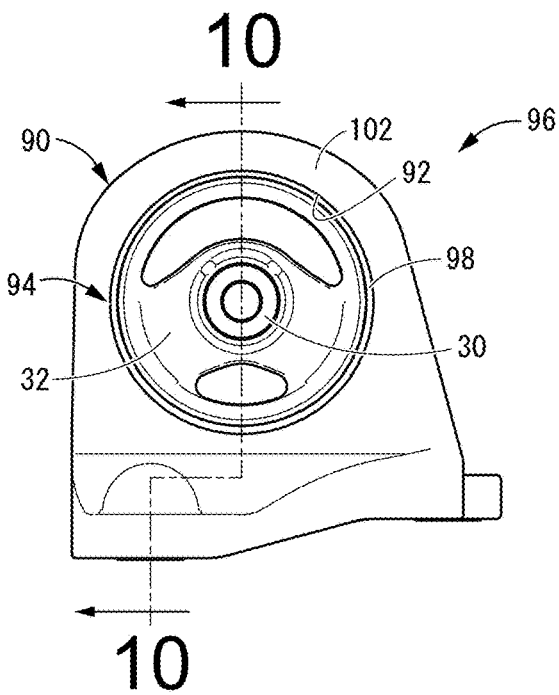
FIG. 8 is a front view showing another practical embodiment of the vehicle-use resin module according to the present invention.
Figure 9:
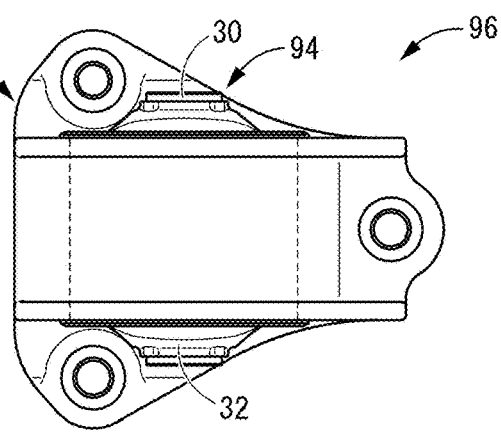
FIG. 9 is a top plan view of the vehicle-use resin module shown in FIG. 8.
Figure 10:
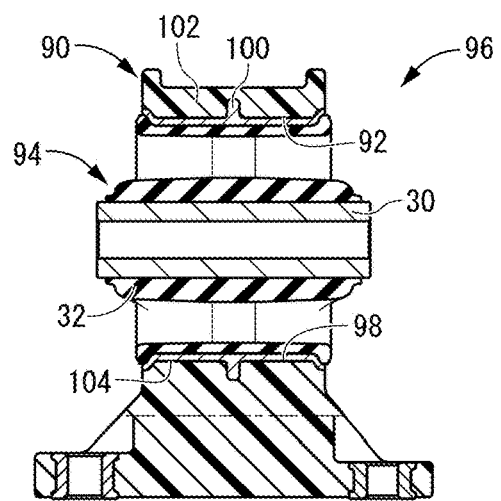
FIG. 10 is a cross sectional view taken along line 10-10 of FIG. 8.

For example, in the preceding practical embodiments, the strength member made of synthetic resin is the roughly L-shaped suspension arm 12, but it may be a roughly A-shaped or I-shaped arm, rod, or the like, or may alternatively be a torque rod or a bracket 90 shown in FIGS. 8 to 10. That is, in the present embodiment, a vibration damping device 94 serving as an attachment member is attached to a mounting hole 92 provided in the bracket 90, so as to constitute an engine mount 96 serving as a vehicle-use resin module. The vibration damping device 94 includes an outer fitting 98, and an outer circumferential projection 100 projecting to the radially outer side is provided at the middle portion of the outer fitting 98 in the center axis direction of the mounting hole 92 (left-right direction in FIG. 10). The outer circumferential projection 100 is embedded inside a circumferential wall 102 of the mounting hole 92 such that the outer circumferential projection 100 is inserted inside the circumferential wall 102. Besides, an adhesive 104 is interposed between the contact surfaces of the outer fitting 98 and the circumferential wall 102, and the outer fitting 98 and the circumferential wall 102 are adhered with the adhesive 104. With the engine mount 96 having such a structure as well, the same effects as those of the preceding practical embodiments can be exhibited.

Also, the attachment member attached to the mounting hole is not limited to the first and second vibration damping devices 13a, 13b and the ball joint 13c described in the preceding practical embodiments. In addition to various known vibration damping devices and joints, for example, a bearing, an anchor bolt, a sleeve for inserting and securing bolts, or the like may be used as long as an external force is exerted thereon.

The suspension arm 12 of the preceding practical embodiment includes three mounting holes 14a, 14b, 14c (first, second, and third mounting holes 14a, 14b, 14c), and the attachment members 13a, 13b, 13c are each provided with the outer fitting 28 having the outer circumferential projections 34. However, the number of mounting holes is not limited, but one or multiple mounting holes may be provided. In case of multiple mounting holes, with respect to multiple attachment members to be attached to the mounting holes, it is acceptable as long as at least one of the attachment members includes the outer fitting having the outer circumferential projection and is fixed to the circumferential wall of the mounting hole, and the other attachment members may have a conventionally known structure.

Moreover, the reinforcer is not limited to the shape described in the preceding practical embodiments. For example, it would also be acceptable that the reinforcer does not include the circumferential-wall reinforcers (first, second, and third tubular reinforcers 48a, 48b, 48c), and the end of the plate-shaped reinforcer is configured to be overlapped with the outer circumferential projection provided to the outer fitting in the vertical direction. Alternatively, it would also be possible that the reinforcer does not include the plate-shaped reinforcer, and one or multiple circumferential-wall reinforcers are independently provided in the circumferential wall of the mounting hole. Incidentally, in the first and second practical embodiments, the circumferential-wall reinforcers (first, second, and third tubular reinforcers 48a, 48b, 48c) project downward so as to have a shape processed by burring. However, the circumferential-wall reinforcer is not limited to such an embodiment, but may be an annular portion that extends roughly in the same plane as the plate-shaped reinforcer.

Furthermore, in the first and second practical embodiments, the axial intermediate resin layer 52 is provided between the outer circumferential projection 34 and the corresponding one of the first, second, and third tubular reinforcers 48a, 48b, 48c, but the axial intermediate resin layer is dispensable. Nevertheless, by providing the axial intermediate resin layer, it is possible not only to sufficiently obtain the bonding area between the strength member and the circumferential wall of the mounting hole, but also to effectively suppress downward projection of the outer fitting 28, particularly in the case where the outer circumferential projection 34 is provided on the upper end of the outer fitting 28 as in the preceding practical embodiments. The outer circumferential projection is not limited to the embodiment of being provided on the upper end of the outer fitting, but may be provided on the vertically middle portion or lower end portion of the outer fitting. In that case, the reinforcer may be below the outer circumferential projection as in the first and second practical embodiments, or may alternatively be above the outer circumferential projection.

Besides, in the first and second practical embodiments, the outer circumferential projection 34 and the circumferential-wall reinforcer (first, second, and third tubular reinforcers 48a, 48b, 48c) each extend continuously about the entire circumference in the circumferential direction, but they may be each formed with a circumferential length of, for example, a half of the circumference. In that case, the outer circumferential projection and the circumferential-wall reinforcer do not need to be overlapped with each other in the vertical direction across the entire length in the circumferential direction, and they are preferably overlapped in a portion thereof in the circumferential direction. It should be noted that the outer circumferential projection does not need to have a roughly constant projecting dimension from the tubular part to the radially outer side in the circumferential direction, but may have a projecting dimension to the radially outer side varied in the circumferential direction. It would also be acceptable to provide the outer circumferential projection with a protrusion further projecting in the axial direction.

Additionally, in the first and second practical embodiments, the reinforcer 42 is embedded in the roughly entire suspension arm 12. However, the reinforcer may be fixed to, for example, the upper surface or the lower surface of the strength member. In that case, whereas the reinforcer may be adhered at the same time of molding of the strength member as in the manufacturing method described in the first practical embodiment, the strength member and the reinforcer may alternatively be formed separately from each other and then fixed together. Indeed, when insert molding is performed in a roughly embedded state, the occurrence of gaps does not cause a big problem in many cases, and the reinforcer and the strength member are not necessarily adhered to each other.

In the manufacturing method described in the first practical embodiment, the suspension arm 12 undergoes insert molding with the integrally vulcanization molded component of the rubber elastic body 32 (first vibration damping device 13a) inserted into the forming cavity 62 of the mold 60 of the suspension arm 12. However, the suspension arm may undergo insert molding with only the outer fitting inserted. Then, thereafter, a rubber elastic body including an inner fitting, for example, may be fixed to the inner circumferential surface of the outer fitting.

What is claimed is:
1. A vehicle-use resin module comprising:
   a strength member made of synthetic resin and including a mounting hole; and
   an attachment member attached to the mounting hole and configured to be subjected to an external force, the attachment member including an outer fitting having a tubular part arranged in the mounting hole in an inserted state, the outer fitting including an outer circumferential projection projecting to a radially outer side of the tubular part, wherein the strength member comprises an insertion-molded component having a structure in which the outer circumferential projection of the outer fitting is embedded inside a circumferential wall of the mounting hole such that the outer circumferential projection is inserted inside the circumferential wall, and a surface of the tubular part of the outer fitting and a surface of the outer circumferential projection are each directly fixed to the strength member with an adhesive.

2. The vehicle-use resin module according to claim 1, wherein a reinforcer made of metal is fixed to the strength member, and the outer circumferential projection of the outer fitting is overlapped with the reinforcer in a center axis direction of the mounting hole.

3. The vehicle-use resin module according to claim 2, wherein the reinforcer integrally includes a circumferential-wall reinforcer positioned in the circumferential wall of the mounting hole and a plate-shaped reinforcer extending from the circumferential wall of the mounting hole to the radially outer side.

4. The vehicle-use resin module according to claim 2, wherein the reinforcer is spaced apart from an inner circumferential surface of the mounting hole to the radially outer side, and an axis-perpendicular intermediate resin layer comprising the synthetic resin that constitutes the strength member is interposed between the reinforcer and the tubular part of the outer fitting.

5. The vehicle-use resin module according to claim 2, wherein the reinforcer is exposed on an inner circumferential surface of the mounting hole, and the reinforcer and the tubular part of the outer fitting are in contact with each other.

6. The vehicle-use resin module according to claim 2, wherein the reinforcer and the outer circumferential projection are spaced apart from each other in the center axis direction of the mounting hole, and an axial intermediate resin layer comprising the synthetic resin that constitutes the strength member is interposed between the reinforcer and the outer circumferential projection.

7. The vehicle-use resin module according to claim 2, wherein at least one of the outer circumferential projection of the outer fitting and the reinforcer is provided continuously about an entire circumference of the mounting hole in a circumferential direction.

8. A method of manufacturing a vehicle-use resin module comprising a strength member made of synthetic resin and including a mounting hole, and an attachment member attached to the mounting hole and configured to be subjected to an external force, the method comprising:

adopting an outer fitting in the attachment member, the outer fitting including a tubular part configured to be arranged in the mounting hole in an inserted state and an outer circumferential projection projecting to a radially outer side of the tubular part;

inserting the outer fitting into a forming cavity of a mold of the strength member; and performing insert molding by filling the forming cavity with resin material with an adhesive attached to the tubular part and the outer circumferential projection of the outer fitting such that, at the same time of molding of the strength member, the tubular part of the outer fitting is adhered to the mounting hole of the strength member while the outer circumferential projection of the outer fitting is embedded and adhered inside a circumferential wall of the mounting hole such that the outer circumferential projection is inserted inside the circumferential wall.

9. The method of manufacturing a vehicle-use resin module according to claim 8, wherein a reinforcer configured to be embedded inside the strength member is set within the forming cavity of the strength member together with the outer fitting with an adhesive attached to an outer circumferential surface of the reinforcer such that the reinforcer is adhered to the strength member at the same time of molding of the strength member.

10. The vehicle-use resin module according to claim 1, wherein the attachment member further includes an inner fitting inserted into the outer fitting, and a rubber elastic body disposed radially between the outer fitting and the inner fitting, the rubber elastic body being bonded by vulcanization to an inner circumferential surface of the outer fitting and an outer circumferential surface of the inner fitting.

11. The method of manufacturing a vehicle-use resin module according to claim 8, wherein the attachment member further includes an inner fitting inserted into the outer fitting, and a rubber elastic body disposed radially between the outer fitting and the inner fitting, the rubber elastic body being bonded by vulcanization to an inner circumferential surface of the outer fitting and an outer circumferential surface of the inner fitting.

* * * * *